(12) United States Patent
Usami

(10) Patent No.: US 9,915,302 B2
(45) Date of Patent: Mar. 13, 2018

(54) DRIVE UNIT AND ELECTRIC-MOTOR-ASSISTED BICYCLE

(71) Applicant: YAMAHA HATSUDOKI KABUSHIKI KAISHA, Iwata-shi, Shizuoka (JP)

(72) Inventor: Tomohiro Usami, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/453,970

(22) Filed: Mar. 9, 2017

(65) Prior Publication Data

US 2017/0356508 A1  Dec. 14, 2017

(30) Foreign Application Priority Data

Jun. 10, 2016  (JP) .................. 2016-115869

(51) Int. Cl.

| | |
|---|---|
| F16D 41/30 | (2006.01) |
| B62M 6/55 | (2010.01) |
| B62M 23/00 | (2006.01) |
| F16D 41/12 | (2006.01) |
| F16D 41/06 | (2006.01) |

(52) U.S. Cl.
CPC ............ F16D 41/30 (2013.01); B62M 6/55 (2013.01); B62M 23/00 (2013.01); F16D 41/12 (2013.01); *F16D 2041/0605* (2013.01)

(58) Field of Classification Search
None
See application file for complete search history.

(56) References Cited

U.S. PATENT DOCUMENTS

| | | | |
|---|---|---|---|
| 3,720,294 A | 3/1973 | Plamper | |
| 4,410,060 A * | 10/1983 | Cunard | ............... B62M 6/55 |
| | | | 180/11 |
| 5,915,493 A | 6/1999 | Nakayama | |
| 5,941,333 A * | 8/1999 | Sun | ............... B62M 6/55 |
| | | | 180/206.4 |
| 6,080,073 A * | 6/2000 | Liu | ............... B62M 6/55 |
| | | | 180/206.1 |

(Continued)

FOREIGN PATENT DOCUMENTS

| | | |
|---|---|---|
| EP | 0 636 536 A1 | 2/1995 |
| EP | 0 847 915 A2 | 6/1998 |
| JP | 08-53094 A | 2/1996 |

*Primary Examiner* — Colby M Hansen
(74) *Attorney, Agent, or Firm* — Keating and Bennett, LLP

(57) ABSTRACT

In a drive unit attached to a vehicle-body frame of an electric-motor-assisted bicycle including a one-way clutch including an outer member, an inner member, a plurality of clutch lugs, a plurality of springs, and a plurality of pins. Clutch teeth are located on one of an inner peripheral portion of the outer member and an outer peripheral portion of the inner member. The clutch lugs and the springs are located on the other of the inner peripheral portion and the outer peripheral portion. A number of the clutch lugs is an even number not smaller than four. A number of the clutch teeth is an even number that is not a multiple of the number of the clutch lugs. A number of the springs is half the number of clutch lugs. Each spring exerts a biasing force on two of the clutch lugs that are circumferentially adjacent. Each pin is in contact with one of the springs.

8 Claims, 10 Drawing Sheets

(56) References Cited

U.S. PATENT DOCUMENTS 6,263,993 B1 * 7/2001 Lin .......................... B62M 6/55
                                                    180/206.4
8,651,993 B1 * 2/2014 Watarai .................. B62M 6/55
                                                    475/205

* cited by examiner

DRIVE UNIT AND ELECTRIC-MOTOR-ASSISTED BICYCLE

CROSS REFERENCE TO RELATED APPLICATIONS

This application claims the benefit of priority to Japanese Patent Application No. 2016-115869 filed on Jun. 10, 2016. The entire contents of this application are hereby incorporated herein by reference.

BACKGROUND OF THE INVENTION

1. Field of the Invention

The present invention relates to a drive unit and an electric-motor-assisted bicycle and more particularly to a drive unit including a one-way clutch that is coaxial with a crank axle, and an electric-motor-assisted bicycle including such a drive unit.

2. Description of the Related Art

Bicycles are used by many people, regardless of age and gender, as a handy transportation means. In recent years, electric-motor-assisted bicycles that add motor driving forces to rider pedaling forces to assist the rider have become popular. Such an electric-motor-assisted bicycle is disclosed in JP Hei8(1996)-53094 A, for example.

The above publication describes an electric-motor-assisted bicycle that includes a drive unit. The drive unit includes a crank axle. Pedals are mounted on the crank axle by arms. The drive unit is attached to a vehicle-body frame.

According to JP Hei8(1996)-53094, the drive unit further includes a one-way clutch that is coaxial with the crank axle. The one-way clutch includes an inner ring, an outer ring, a plurality of lugs, and a spring. The inner ring is fixed to the crank axle. The outer ring includes a void in which the inner ring is housed. A plurality of engagement teeth are located on the inner periphery of the outer ring and arranged along the entire circumference. The lugs are located between the inner and outer rings. The spring exerts a biasing force on the lugs. This arrangement causes each lug to engage one of the engagement teeth.

SUMMARY OF THE INVENTION

A drive unit was not present in conventional bicycles. For bicycles where travelling performance is important, such as racing bicycles, the drive unit may be considered an obstacle and may decrease travelling performance. For example, a one-way clutch may cause a time lag between a moment that the rider steps on the pedal and a moment that the resulting drive power is transmitted to a rear wheel.

To reduce the time lag, a number of engagement teeth may be increased, for example. However, increasing the number of engagement teeth may increase a size (radial dimension) of the one-way clutch.

Further, the one-way clutch is located along a path which transmits tread forces input by the rider to the rear wheel. Thus, operation stability is required.

Preferred embodiments of the present invention reduce a time lag, avoid an increase in the size of the one-way clutch, and stabilize the operation of the one-way clutch.

A drive unit according to a preferred embodiment of the present invention is attached to a vehicle-body frame of an electric-motor-assisted bicycle. The drive unit includes a housing, a crank axle, and a one-way clutch. The crank axle extends through the housing. The one-way clutch is coaxial with the crank axle. The one-way clutch includes an outer member and an inner member. The outer member includes an inner peripheral portion. The inner peripheral portion includes an inner peripheral surface of the outer member. The inner member extends through the outer member. The inner member includes an outer peripheral portion. The outer peripheral portion includes an outer peripheral surface of the inner member. The outer peripheral portion faces the inner peripheral portion of the outer member such that the outer peripheral portion and the inner peripheral portion are arranged in a radial direction of the crank axle. One of the outer member and the inner member rotates together with the crank axle. A plurality of clutch teeth is provided on one of the inner peripheral portion of the outer member and the outer peripheral portion of the inner member. The clutch teeth are spaced apart from each other by an equal or substantially equal distance in a circumferential direction of the crank axle. The one-way clutch further includes a plurality of clutch lugs and a plurality of springs. The clutch lugs are provided on the other of the inner peripheral portion of the outer member and the outer peripheral portion of the inner member. The clutch lugs are spaced apart from each other by an equal or substantially equal distance in the circumferential direction. The springs are provided on the other of the inner peripheral portion of the outer member and the outer peripheral portion of the inner member and spaced apart from each other by an equal or substantially equal distance in the circumferential direction. The number of the clutch lugs preferably is an even number not smaller than 4 (four), for example. The number of the clutch teeth preferably is an even number that is not a multiple of the number of the clutch lugs, for example. The number of the springs preferably is half the number of the clutch lugs, for example. Each of the plurality of springs is capable of exerting a biasing force on two of the plurality of clutch lugs that are adjacent along the circumferential direction to hold them at a position for engagement with two of the plurality of clutch teeth. The one-way clutch further includes a plurality of pins. The plurality of pins are provided on the other of the inner peripheral portion of the outer member and the outer peripheral portion of the inner member. Each of the plurality of pins is in contact with one of the plurality of springs to restrict movement of this spring. When one of the two clutch lugs on which the spring restricted from moving exerts the biasing force is pushed in from the position for engagement by a back of one of the plurality of clutch teeth, the biasing force exerted on the other one of the two clutch lugs increases.

The above-described drive unit reduces a time lag and, at the same time, avoids an increase in the size of the one-way clutch and stabilizes the operation of the one-way clutch.

An implementation of the clutch teeth provided on the inner peripheral portion of the outer member may be, for example, that where the clutch teeth are provided on the inner peripheral surface of the outer member.

An implementation of the clutch teeth provided on the outer peripheral portion of the inner member may be, for example, that where the clutch teeth are provided on the outer peripheral surface of the inner member.

An implementation of the clutch lugs provided on the inner peripheral portion of the outer member may be, for example, that where at least a portion of each of the clutch lugs is in contact with the inner peripheral surface of the outer member, or that where at least a portion of each of the clutch lugs is located radially outward of the inner peripheral surface of the outer member. An implementation of at least a portion of each of the clutch lugs located radially outward of the inner peripheral surface of the outer member may be, for example, that where at least a portion of each of the clutch lugs is located within a recess in the inner peripheral surface of the outer member.

An implementation of the clutch lugs provided on the outer peripheral portion of the inner member may be, for example, that where at least a portion of each of the clutch lugs is in contact with the outer peripheral surface of the inner member, or that where at least a portion of each of the clutch lugs is located radially inward of the outer peripheral surface of the inner member. An implementation of at least a portion of each of the clutch lugs located radially inward of the outer peripheral surface of the inner member may be, for example, that where at least a portion of each of the clutch lugs is located within a recess in the outer peripheral surface of the inner member.

An implementation of the springs provided on the inner peripheral portion of the outer member may be, for example, that where at least a portion of each of the springs is located radially outward of the inner peripheral surface of the outer member. An implementation of at least a portion of each of the springs located radially outward of the inner peripheral surface of the outer member may be, for example, that where at least a portion of each of the springs is located within a recess in the inner peripheral surface of the outer member, or that where at least a portion of each of the springs is located within a tunnel-shaped space formed in the outer member. The recess within which the spring is located may be, for example, a slit open on the inner peripheral surface of the outer member and extending in the circumferential direction.

An implementation of the springs provided on the outer peripheral portion of the inner member may be, for example, that where at least a portion of each of the springs is located radially inward of the outer peripheral surface of the inner member. An implementation of at least a portion of each of the springs located radially inward of the outer peripheral surface of the inner member may be, for example, that where at least a portion of each of the springs is located within a recess in the outer peripheral surface of the inner member, or that where at least a portion of each of the springs is located within a tunnel-shaped space in the inner member. The recess within which the spring is located may be, for example, a slit being open on the outer peripheral surface of the inner member and extending in the circumferential direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
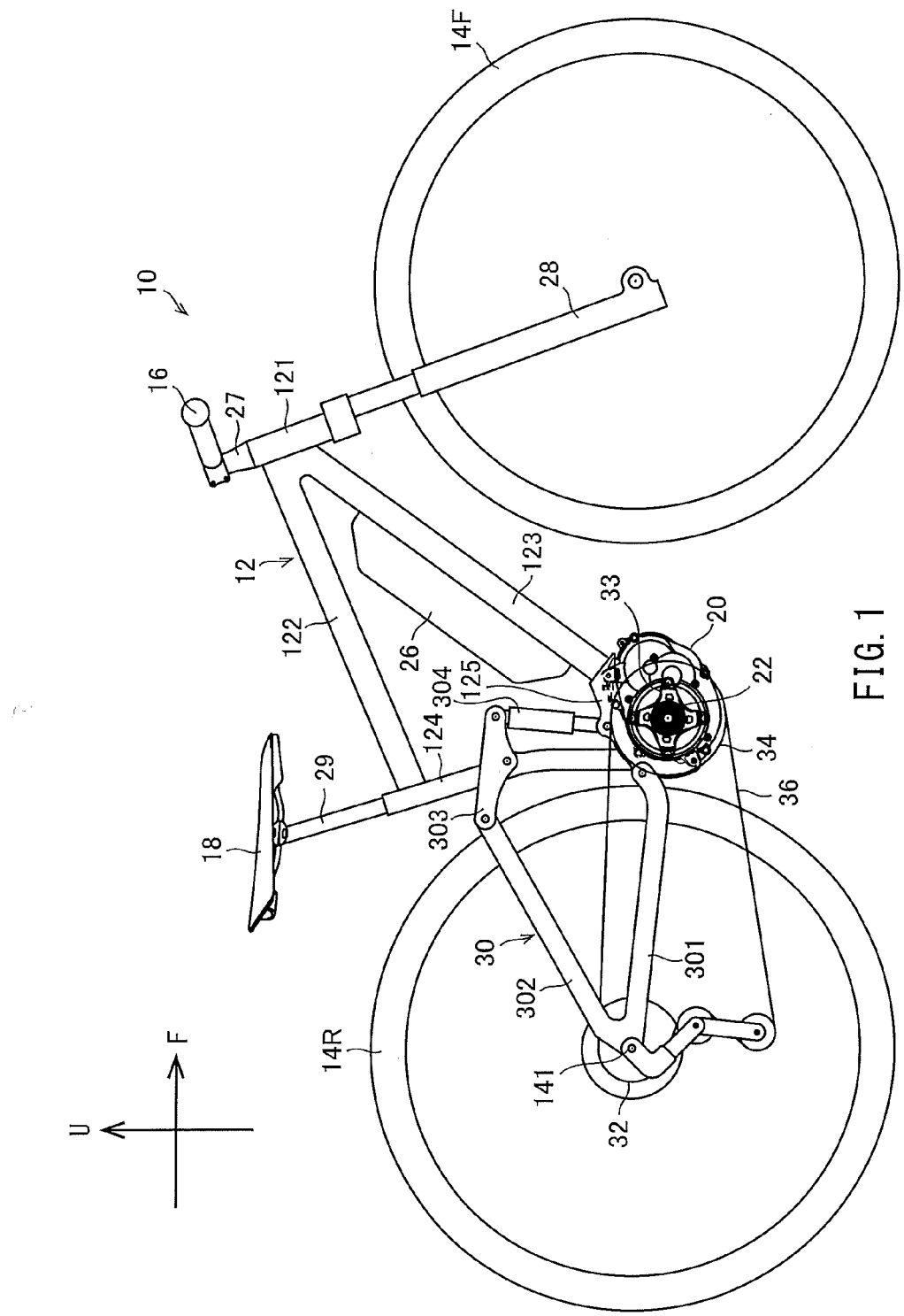
FIG. 1 is a right-side view of an electric-motor-assisted bicycle according to a preferred embodiment of the present invention.

The present inventors researched and developed a drive unit including a one-way clutch that is coaxial with a crank axle and that reduces a time lag between a moment that the rider steps on the pedal and a moment that the resulting drive power is transmitted to the rear wheel.

The present inventors investigated a cause of the time lag, and concluded that a time required for a clutch lug to come into engagement with a clutch tooth causes the time lag.

The present inventors considered increasing the number of clutch teeth to reduce the time lag. Increasing the number of clutch teeth reduces the time required for a clutch lug to come into engagement with a clutch tooth (the time lag).

To increase the number of clutch teeth, a size of the clutch teeth may be reduced, for example. However, reducing the size of the clutch teeth makes it difficult for a clutch tooth to get caught on a clutch lug.

To increase the number of clutch teeth without changing the size of the clutch teeth, the radial dimension of the one-way clutch may be increased, for example. However, increasing the radial dimension of the one-way clutch reduces a space within the housing of the drive unit in which other components are positioned.

Accordingly, the present inventors researched and developed a drive unit that avoids an increase in the radial dimension of the one-way clutch and still reduces the time lag.

The present inventors investigated structures for a one-way clutch that is coaxial with the crank axle which would stabilize transmission of torque, and discovered that the transmission of torque is stabilized when two opposing clutch lugs are arranged in a radial direction of the crank axle and each of these clutch lugs engages a clutch tooth.

Providing two clutch lugs means that the two clutch lugs are always used when transmitting torque. In such an arrangement, the load on each clutch lug is larger than that in arrangements where four clutch lugs engage clutch teeth simultaneously. Thus, in such an arrangement, durability of the clutch lugs needs to be improved.

Accordingly, the present inventors further researched how to improve the durability of the clutch lugs. The inventors focused on arrangements where a number of clutch lugs is preferably an even number which is not smaller than four, for example, and where preferably two of the clutch lugs engage clutch teeth at a given moment. The present inventors discovered that a preferred number of clutch teeth is an even number that is not a multiple of the number of clutch lugs, for example.

Unfortunately, it is difficult to stabilize the operation of the one-way clutch by simply having the above described relationship between the number of clutch teeth and the number of clutch lugs, as will be explained below.

If the number of clutch teeth and the number of clutch lugs have the relationship described above, two opposing clutch lugs arranged in a radial direction engage clutch teeth, while the other clutch lugs are pushed in by backs of the clutch teeth. If only one spring exerts a biasing force on the four clutch lugs, as described in JP Hei8 (1996)-53094 A, an operation of one of two circumferentially adjacent clutch lugs (in a direction of the crank axle) may affect the operation of the other clutch lug. This will be explained below.

As one clutch lug is pushed in by a back of a clutch tooth, the spring is deformed. The biasing force exerted by the spring on the other clutch lug decreases. Accordingly, the other clutch lug may move away from the position at which the other clutch lug could engage a clutch tooth.

When the other clutch lug moves away from the position at which the other clutch lug could engage a clutch tooth, the other clutch lug may not properly engage a clutch tooth. Thus, the operation of the one-way clutch is unstable.

The present inventors focused on and researched the spring that exerts the biasing force on the clutch lugs in order to stabilize the operation of the one-way clutch, and consequently developed preferred embodiments of the present invention.

Preferred embodiments of the present invention will be described below with reference to the drawings. The same or corresponding elements or features are labeled with the same characters in the drawings and their description will not be repeated.

Referring to FIG. 1, an electric-motor-assisted bicycle 10 according to a preferred embodiment of the present invention will be described. FIG. 1 is a schematic right-side view of the electric-motor-assisted bicycle 10.

In the following description, the directions "front/forward", "rear/rearward", "left", "right", "top/upward" and "bottom/downward" mean directions as perceived by a rider sitting on a saddle 18 of the electric-motor-assisted bicycle 10. In the drawings referred to in the following description, arrow "F" indicates a forward direction of the vehicle; arrow "U" indicates an upward direction of the vehicle; arrow "L" indicates a left direction of the vehicle; and arrow "R" indicates a right direction of the vehicle.

The electric-motor-assisted bicycle 10 includes a vehicle-body frame 12, a front wheel 14F, a rear wheel 14R, handlebars 16, the saddle 18, a drive unit 20, and a battery 26.

The vehicle-body frame 12 includes a head tube 121, a top tube 122, a down tube 123, a seat tube 124 and a bracket 125.

The head tube 121 is located at a front of the vehicle-body frame 12 and extends in a top/bottom direction. A stem 27 extends into the head tube 121 such that the stem is rotatable. The handlebars 16 are fixed to a top end of the stem 27. A front fork 28 is fixed to a bottom end of the stem 27. The front wheel 14F is rotatably attached to a bottom end of the front fork 28. For example, the front wheel 14F is supported by the vehicle-body frame 12 with the stem 27 and the front fork 28 located in between.

The top tube 122 is located rearward of the head tube 121 and extends in a front/rear direction. A front end of the top tube 122 is connected to the head tube 121. A rear end of the top tube 122 is connected to the seat tube 124.

The down tube 123 is located rearward of the head tube 121 and extends in the front/rear direction. The down tube 123 is located below the top tube 122. A front end of the down tube 123 is connected to the head tube 121. In a preferred embodiment, the front end of the down tube 123 is also connected to the front end of the top tube 122, for example. A rear end of the down tube 123 is connected to the bracket 125.

The battery 26 is attached to the down tube 123. The battery 26 supplies the drive unit 20 with electric power. The battery 26 includes a chargeable/dischargeable battery and a controller. The controller controls charging or discharging of the battery, and monitors battery output current, remaining battery level, and other parameters.

The seat tube 124 is located rearward of the top tube 122 and the down tube 123 and extends in the top/bottom direction. A bottom end of the seat tube 124 is connected to the bracket 125. For example, the seat tube 124 extends upwardly from the bracket 125.

The seat tube 124 is bent or curved at a center in the top/bottom direction. As such, a lower portion of the seat tube 124 extends in the top/bottom direction and an upper portion of the seat tube 124 extends in a direction angled relative to the top/bottom direction.

A seat post 29 extends into the seat tube 124. The saddle 18 is attached to a top end of the seat post 29.

The bracket 125 is located at a bottom of the vehicle-body frame 12. The bracket 125 supports the drive unit 20. The drive unit 20 generates driving forces to be transmitted to the rear wheel 14R which is located rearward of the front wheel 14F. The drive unit 20 will be described in detail below.

The vehicle-body frame 12 further includes a swing arm 30, a pair of connecting arms 303 and a suspension 304. The swing arm 30 includes a pair of chain stays 301 and a pair of seat stays 302.

The chain stays 301 are arranged in the left/right direction and extend in the front/rear direction. The rear wheel 14R is located between the chain stays 301. The chain stays 301 are mirror images of each other. Accordingly, only the right chain stay 301 is shown in FIG. 1.

A front end of each of the chain stays 301 is attached to the bracket 125. For example, the chain stays 301 extend rearwardly from the bracket 125. The chain stays 301 swing or pivot relative to the bracket 125 about an axis that extends in the left/right direction.

An axle 141 of the rear wheel 14R is attached to the rear ends of the chain stays 301 such that the axle 141 cannot rotate. For example, the rear wheel 14R is supported on the chain stays 301 such that the rear wheel rotates about the axle 141. Thus, the rear wheel 14R is supported by the vehicle-body frame 12. A multi-stage driven sprocket 32 is fixed to the rear wheel 14R.

The seat stays 302 are arranged in the left/right direction and extend in the front/rear direction. The rear wheel 14R is located between the seat stays 302. The seat stays 302 are mirror images of each other. Accordingly, only the right seat stay 302 is shown in FIG. 1.

A rear end of the left seat stay 302 is connected to a rear end of the left chain stay 301. A rear end of the right seat stay 302 is connected to a rear end of the right chain stay 301.

The connecting arms 303 are arranged in the left/right direction and extend in the front/rear direction. The seat tube 124 is located between the connecting arms 303. The connecting arms 303 are mirror images of each other. Accordingly, only the right connecting arm 303 is shown in FIG. 1.

The connecting arms 303 are attached to the seat tube 124. The connecting arms 303 swing or pivot relative to the seat tube 124 about an axis that extends in the left/right direction.

As viewed from a side of the vehicle, front ends of the connecting arms 303 are located forward of the seat tube 124. As viewed from a side of the vehicle, rear ends of the connecting arms 303 are located rearward of the seat tube 124.

The rear end of the left connecting arm 303 is attached to a front end of the left seat stay 302. The left connecting arm 303 swings or pivots relative to the left seat stay 302 about an axis that extends in the left/right direction.

The rear end of the right connecting arm 303 is attached to a front end of the right seat stay 302. The right connecting arm 303 swings or pivots relative to the right seat stay 302 about an axis that extends in the left/right direction.

The suspension 304 is located forward of the seat tube 124 and rearward of the down tube 123. A top end of the suspension 304 is attached to the connecting arms 303. The suspension 304 swings or pivots relative to the connecting arms 303 about an axis that extends in the left/right direction. A bottom end of the suspension 304 is attached to the bracket 125. The suspension 304 swings or pivots relative to the bracket 125 about an axis that extends in the left/right direction. The suspension 304 is attached to the bracket 125 at a position that is forward of a position at which the seat tube 124 is attached to the bracket 125.

A driving sprocket 34 is attached to the drive unit 20 with a support 33 located in between. A chain 36 is wound about the driving sprocket 34 and driven sprocket 32.

A crank arm is attached to each end of a crank axle 22 included in the drive unit 20, in an axial direction. A pedal is attached to each of the crank arms.

Figure 2:
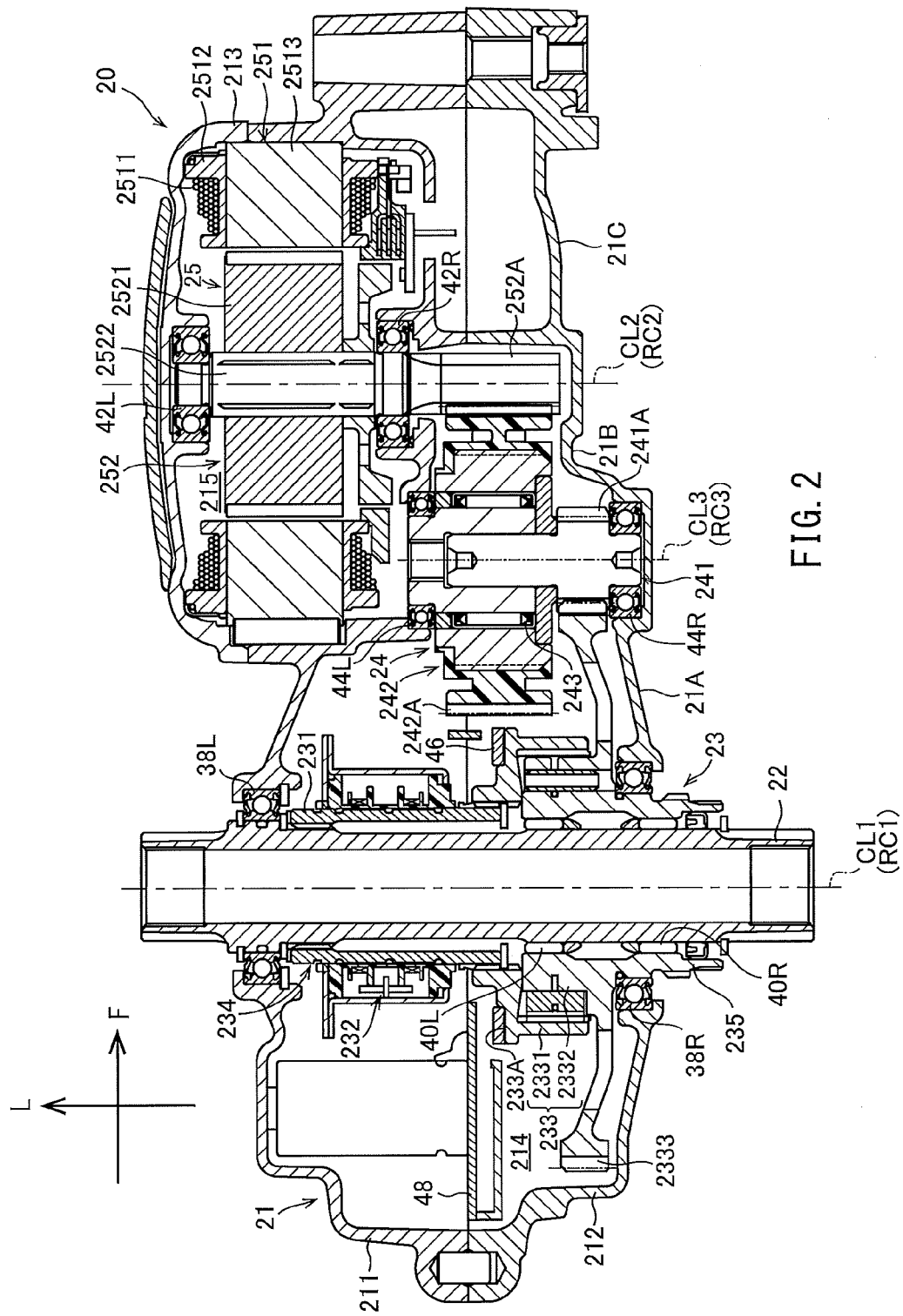
FIG. 2 is a cross-sectional view of the internal structure of a drive unit included in the electric-motor-assisted bicycle shown in FIG. 1.

The drive unit 20 will be described with reference to FIG. 2. FIG. 2 is a cross-sectional view of an internal structure of the drive unit 20.

The drive unit 20 includes a housing 21, the crank axle 22, a rotating shaft 23, a reduction gear 24 and a motor 25. These components will be described below.

The housing 21 is fixed to the bracket 125 by a plurality of fasteners. The housing 21 includes a left housing 211, a right housing 212 and a cover 213. The left housing 211, the right housing 212 and the cover 213 are made of a metal material, for example. The metal material preferably includes an aluminum alloy, for example.

The left housing 211 is laid over the right housing 212 from the left in the left/right direction. The left housing 211 is fixed to the right housing 212 by a plurality of fasteners. A space 214 is defined by the left housing 211 and the right housing 212.

The cover 213 is laid over the left housing 211 from the left in the left/right direction. The cover 213 is fixed to the left housing 211 by a plurality of fasteners. A space 215 is defined by the cover 213 outside the left housing 211 (for example, to the left thereof).

The crank axle 22 extends through the housing 21 in the left/right direction. For example, a central axis CL1 of the crank axle 22 extends in the left/right direction. The central axis CL1 is a rotational center RC1 of the crank axle 22 as viewed in an axial direction of the crank axle 22.

A bore extends through the crank axle 22 in the axial direction of the crank axle 22. The crank axle 22 preferably has a cylindrical or a substantially cylindrical shape, for example.

The crank axle 22 is supported on the housing 21 such that the crank axle rotates relative to the housing about the central axis CL1 of the crank axle 22. A bearing 38L which rotatably supports the crank axle 22 is fixed to the left housing 211. A bearing 38R, which rotatably supports the crank axle 22 with a driven member 2332 of a one-way clutch 233 described below and slide bearings 40L and 40R located in between, is fixed to the right housing 212.

The crank axle 22 extends through the rotating shaft 23. The rotating shaft 23 is housed in the housing 21. The rotating shaft 23 will be described in detail below.

Figure 3:
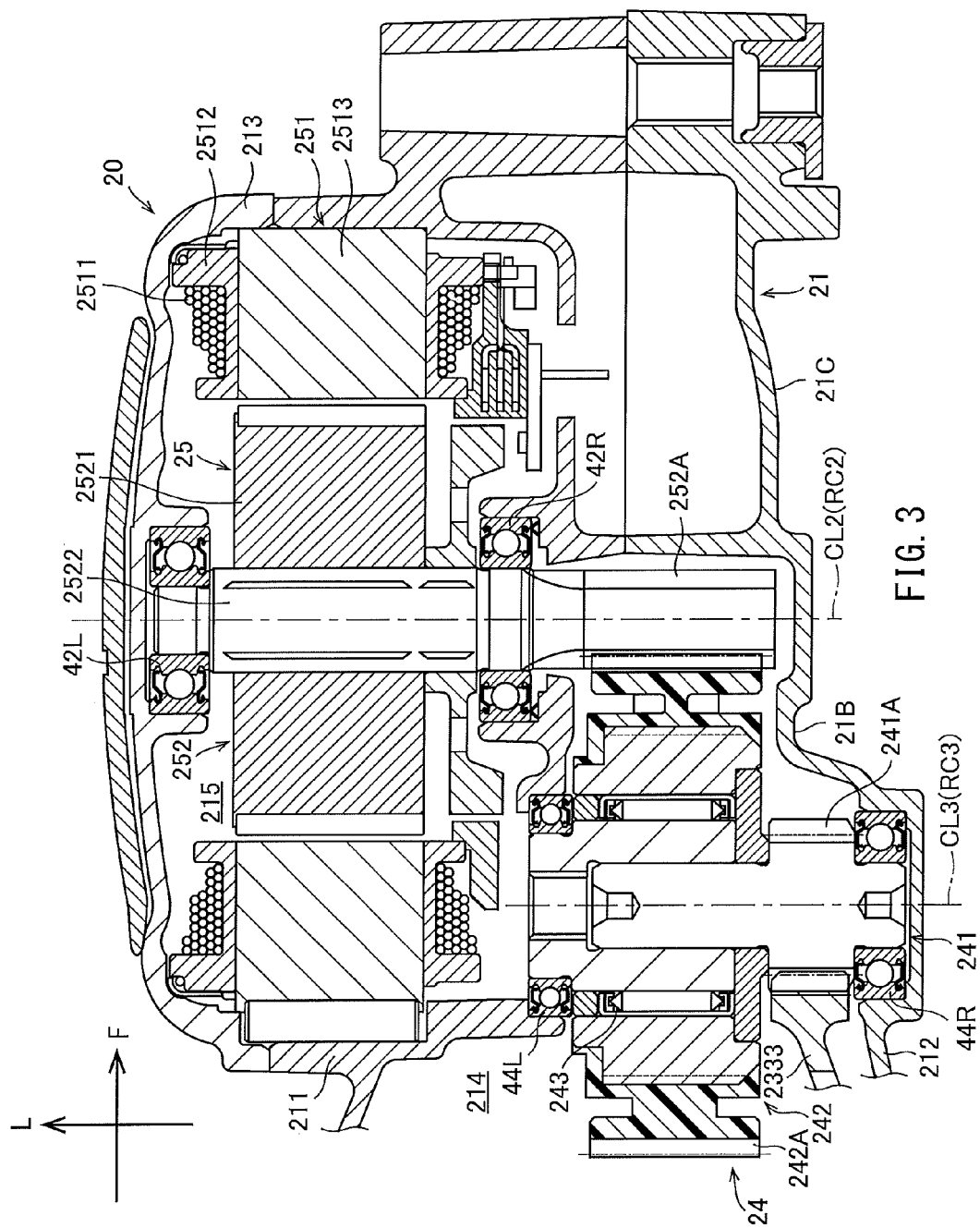
FIG. 3 is an enlarged cross-sectional view of a portion of FIG. 2.

The motor 25 and the reduction gear 24 will be described with reference to FIG. 3. FIG. 3 is an enlarged cross-sectional view of a portion of FIG. 2.

The motor 25 is housed in the housing 21. The motor 25 generates driving forces that assist the rider in propelling the electric-motor-assisted bicycle 10. The motor 25 includes a stator 251 and a rotor 252.

The stator 251 includes a plurality of bobbins 2512 (a preferred embodiment preferably includes 14 bobbins, for example) around which coils 2511 are wound. An iron core 2513 extends into the bobbins 2512. The stator 251 is located within the space 215. The stator 251 is fixed to the left housing 211.

The rotor 252 is located inside the stator 251. A central axis CL2 of the rotor 252 is parallel or substantially parallel to the central axis CL1 of the crank axle 22. For example, the rotor 252 is parallel or substantially parallel to the crank axle 22. The central axis CL2 is a rotational center RC2 of the rotor 252 as viewed in an axial direction of the crank axle 22.

The rotor 252 includes a rotor body 2521 and an output shaft 2522. These components will be described below.

An outer periphery of the rotor body 2521 is magnetized to form N- and S-poles arranged alternately in a circumferential direction. In a preferred embodiment, seven N-poles and seven S-poles, for example, are included.

The output shaft 2522 extends through the rotor body 2521. The output shaft 2522 is fixed to the rotor body 2521. For example, the output shaft 2522 rotates together with the rotor body 2521.

The output shaft 2522 is supported by two bearings 42L and 42R such that the output shaft 2522 rotates relative to the housing 21 about the central axis CL2. The bearing 42L is fixed to the cover 213. The bearing 42R is fixed to the left housing 211 and located to the right of the rotor body 2521 (for example, farther in a second axial direction).

The output shaft 2522 extends through the left housing 211. An output gear 252A is located on portions of the output shaft 2522 that are located within the space 214.

The reduction gear 24 is housed in the housing 21. For example, the reduction gear 24 is located within the space 214. The reduction gear 24 overlaps portions of the motor 25 as viewed in an axial direction of the crank axle 22.

A central axis CL3 of the reduction gear 24 (for example, central axis CL3 of a rotational shaft 241) is parallel or substantially parallel to the central axis CL1 of the crank axle 22. For example, the reduction gear 24 is parallel or substantially parallel to the crank axle 22. The central axis CL3 is a rotational center RC3 of the reduction gear 24 as viewed in an axial direction of the crank axle 22. The rotational center RC3 overlaps the stator 251 as viewed in an axial direction of the crank axle 22.

The reduction gear 24 includes the rotatable shaft 241 and a cylindrical portion 242. These components will be described below.

The cylindrical portion 242 preferably has a cylindrical or a substantially cylindrical shape. The cylindrical portion 242 includes a gear 242A that engages the output gear 252A. The gear 242A preferably has a larger diameter than the output gear 252A and includes more teeth than the output gear 252A. For example, a rotational speed of the gear 242A is lower than a rotational speed of the output gear 252A.

The rotatable shaft 241 extends into the cylindrical portion 242. The rotatable shaft 241 is coaxial with the cylindrical portion 242. The rotatable shaft 241 includes a smalldiameter shaft portion, which includes a gear 241A, that is press-fitted into a large-diameter shaft portion. The gear 241A and the gear 242A are at different locations along the rotatable shaft 241 (in the axial direction of the rotatable shaft 241). The gear 241A is located closer to the right housing 212 than the gear 242A in the left/right direction.

A one-way clutch 243 is located between the rotatable shaft 241 and the cylindrical portion 242. Thus, when the rotor 252 rotates in a positive direction, the rotatable shaft 241 rotates together with the cylindrical portion 242. For example, driving forces from the motor 25 are transmitted to a gear 2333 via the reduction gear 24. When the motor 24 is stationary and the gear 2333 rotates in the forward direction (for example, in a direction of advancement of the vehicle), the rotatable shaft 241 rotates relative to the cylindrical portion 242. For example, rotation of the gear 2333 is not transmitted to the rotor 252.

The rotatable shaft 241 is supported by two bearings 44L and 44R such that the rotatable shaft 241 rotates relative to the housing 21 about the central axis CL3. The bearing 44L is lightly press-fitted into the left housing 211. The bearing 44R is fixed to the right housing 212.

Figure 4:
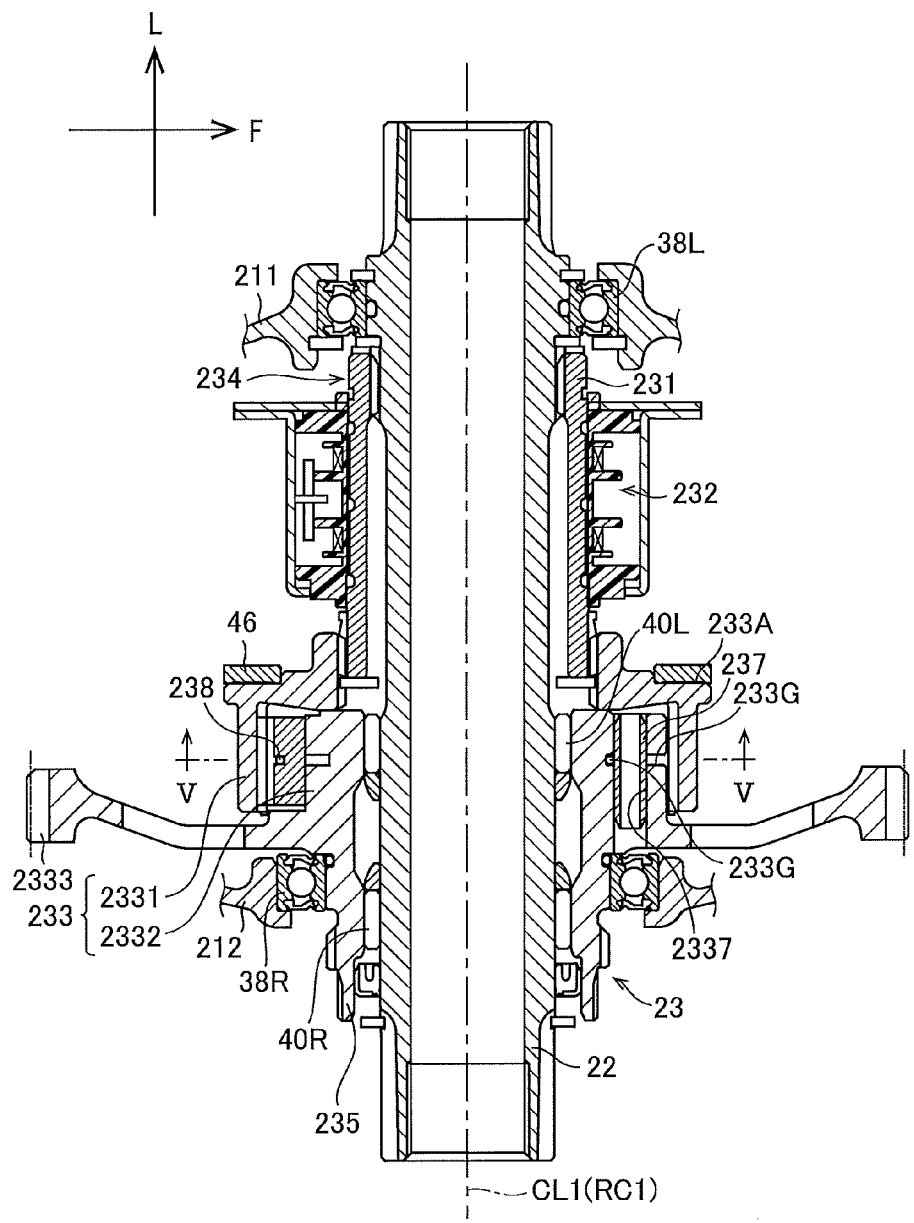
FIG. 4 is an enlarged cross-sectional view of another portion of FIG. 2.

The rotatable shaft 23 will be described with reference to FIG. 4. FIG. 4 is an enlarged cross-sectional view of another portion of FIG. 2.

The rotatable shaft 23 is coaxial with the crank axle 22 and rotates together with the crank axle 22. The crank axle 23 includes a coupling shaft 231 and a one-way clutch 233.

The coupling shaft 231 preferably has a cylindrical or a substantially cylindrical shape. The crank axle 22 extends into the coupling shaft 231. The coupling shaft 231 is coaxial with the crank axle 22.

A left end of the coupling shaft 231 (for example, furthermost position thereon in a first axial direction) is coupled with the crank axle 22 by spline coupling or the like, for example. As such, the coupling shaft 231 rotates together with the crank axle 22 regardless of whether the crank axle 22 rotates in the forward or rearward direction.

A torque detector 232 is located around the coupling shaft 231. The torque detector 232 is supported on the left housing 211.

The torque detector 232 detects torque generated in the coupling shaft 231 when the rider pedals. The torque detector 232 preferably is a known magnetostrictive torque sensor. The torque detector 232 transmits a signal associated with the detected torque to a controller mounted on a substrate 48. The controller receives the signal and determines a pedaling state of the bicycle, which is based on pedaling by the rider, and controls the motor 25.

The one-way clutch 233 is located closer to the right housing 212 than the torque detector 232 in the axial direction of the crank axle 22. The one-way clutch 233 is coaxial with the crank axle 22.

The one-way clutch 233 includes a driving member 2331 which includes an outer member and a driven member 2332 which includes an inner member.

The driving member 2331 preferably has a cylindrical or a substantially cylindrical shape. A right end of the coupling shaft 231 (for example, furthermost position thereon in the second axial direction) extends into a left end of the driving member 2331 (for example, furthermost position thereon in the first axial direction). The driving member 2331 is coaxial with the coupling shaft 231. The right end of the coupling shaft 231 (for example, furthermost position thereon in the second axial direction) is coupled with the left end of the driving member 2331 (for example, furthermost position thereon in the first axial direction) by spline coupling or the like, for example. Accordingly, the driving member 2331 rotates together with the coupling shaft 231 regardless of whether the coupling shaft 231 rotates in the forward or rearward direction. For example, the driving member 2331 rotates together with the crank axle 22 regardless of whether the crank axle 22 rotates in the forward or rearward direction. The coupling shaft 231 and driving member 2331 function or operate as a crank-rotation input shaft 234 that rotates integrally with the crank axle 22.

The outer periphery of the driving member 2331 includes an annular attachment surface 233A. The attachment surface 233A expands radially with respect to the driving member 2331 and extends in a circumferential direction. A ring magnet 46 is fixed to the attachment surface 233A. For example, the ring magnet 46 rotates together with the driving member 2331. A detector mounted on the substrate 48 located within the housing 21 detects changes in magnetic field caused by rotation of the ring magnet 46 and, thus, detects rotation of the driving member 2331 (for example, crank axle 22).

The driven member 2332 preferably has a cylindrical or a substantially cylindrical shape. The crank axle 22 extends into the driven member 2332. Slide bearings 40L and 40R are located between the driven member 2332 and the crank axle 22. Thus, the driven member 2322 is coaxial with the crank axle 22 and rotates relative to it.

The driven member 2332 extends into a right end of the driving member 2331 (for example, furthermost position thereon in the second axial direction). A ratchet working as a one-way clutch mechanism is located between the driven member 2332 and the right end of the driving member 2331 (for example, furthermost position thereon in the second axial direction). Thus, rotational forces in the forward direction from the driving member 2331 are transmitted to the driven member 2332, while rotational forces in the rearward direction from the driving member 2331 are not transmitted to the driven member 2332.

The driven member 2332 is supported by the bearing 38R fixed to the right housing 212 such that the driven member rotates relative to the housing 21 about the central axis CL1 of the crank axle 22.

The driven member 2332 extends through the right housing 212. The driving sprocket 34 (FIG. 1) is attached, by the support 33 (FIG. 1), to portions of the driven member 2332 that are located outward (for example, to the right) of the housing 21.

The driven member 2332 includes a gear 2333. The gear 2333 engages the gear 241 of the reduction gear 24. The gear 2333 preferably has a larger diameter than the gear 241A and preferably has more teeth than the gear 241A. For example, a rotational speed of the gear 2333 is lower than a rotational speed of the gear 241A.

The driven member 2332 includes a resultant-force output shaft 235 that provides a resultant of a human-generated force through the one-way clutch 233 (for example, pedaling force) and a motor-generated driving force through the gear 2333. For example, the resultant-force output shaft 235 is included in the rotatable shaft 23.

Figure 5:
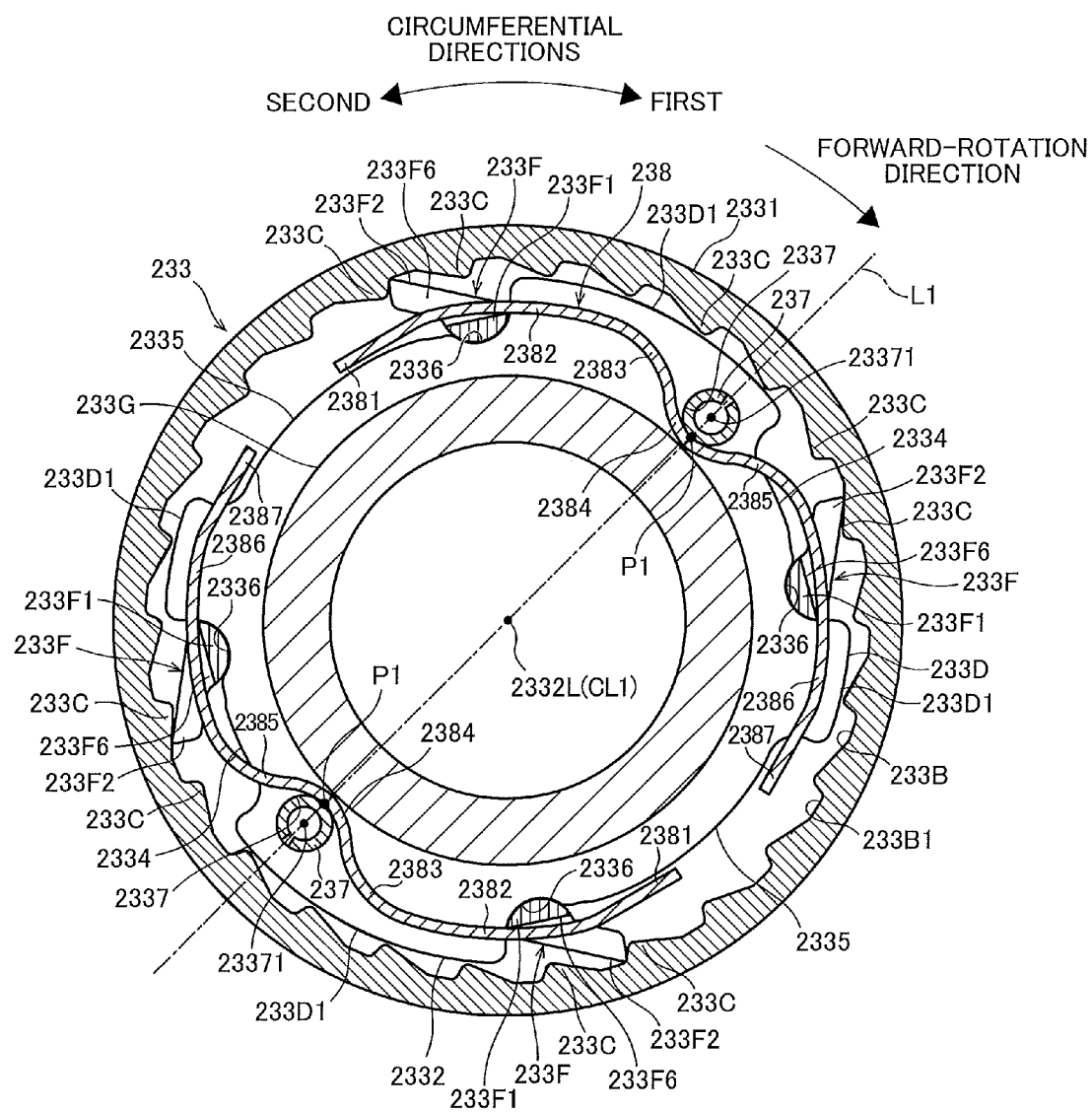
FIG. 5 is a cross-sectional view taken along line V-V of FIG. 4 and showing an internal structure of a one-way clutch.

The one-way clutch 233 will be described with reference to FIG. 5. FIG. 5 shows the internal structure of the one-way clutch 233. FIG. 5 shows that two of four clutch lugs 233F engage clutch teeth 233C.

The driving member 2331 preferably includes an inner peripheral portion 233B. The inner peripheral portion 233B preferably includes an inner peripheral surface 233B1. The inner peripheral surface 233B1 is cylindrical or substantially cylindrical. The inner peripheral surface 233B1 preferably includes a plurality of clutch teeth 233C therein. The clutch teeth 233C are spaced apart from each other by an equal or substantially equal distance in the circumferential direction. The clutch teeth 233C protrude from the inner peripheral surface 233B1. The number of the clutch teeth 233C is preferably 26, for example.

Figure 6:
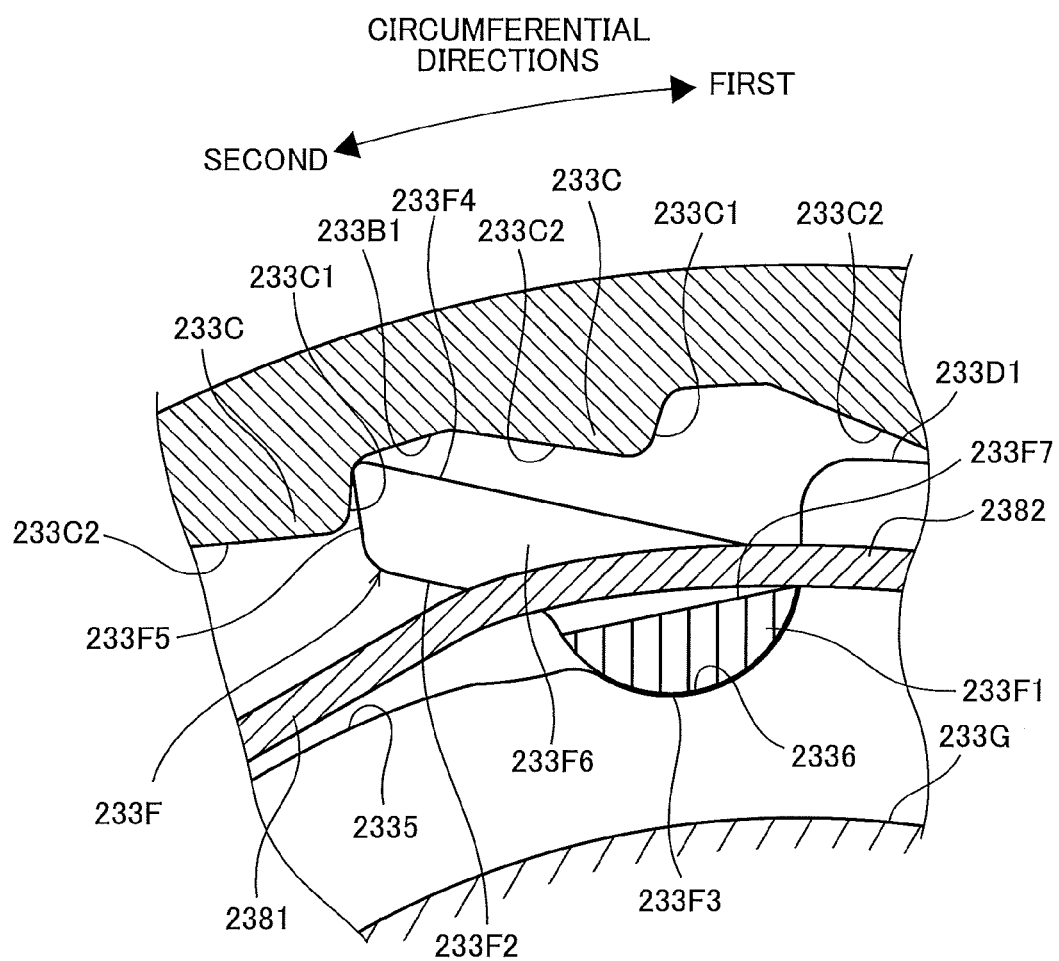
FIG. 6 is an enlarged view of a portion of FIG. 5.

The clutch teeth 233C will be described in detail with reference to FIG. 6. FIG. 6 is an enlarged view of a portion of FIG. 5.

Each of the clutch teeth 233C preferably includes a contact surface 233C1 and a contact surface 233C2. As viewed in an axial direction of the driving member 2331, the contact surface 233C1 is located toward a first circumferential direction with respect to the driving member 2331 relative to the contact surface 233C2. The contact surface 233C1 is located forward of the contact surface 233C2 in a direction in which the crank axle 22 rotates forward (right-handed direction in FIG. 5, for example, first direction).

As viewed in an axial direction of the driving member 2331, the contact surfaces 233C1 and 233C2 extend and protrude from the inner peripheral surface 233B1. For example, the contact surfaces 233C1 and 233C2 extend in directions crossing the circumferential direction of the driving member 2331. As viewed in an axial direction of the driving member 2331, the contact surface 233C1 extends in a direction crossing the contact surface 233C2. In a preferred embodiment of the present invention, as shown in FIG. 6, the contact surface 233C1 extends in a direction that is perpendicular or substantially perpendicular to the contact surface 233C2. As viewed in an axial direction of the driving member 2331, an amount of extension of the contact surface 233C1 from the inner peripheral surface 233B1 is smaller than the amount of extension of the contact surface 233C2 from the inner peripheral surface 233B1. An angle of inclination of the contact surface 233C1 relative to the inner peripheral surface 233B1 is larger than the angle of inclination of the contact surface 233C2 relative to the inner peripheral surface 233B1 to allow the contact surface 233C1 to engage a clutch lug 233F.

Figure 7:
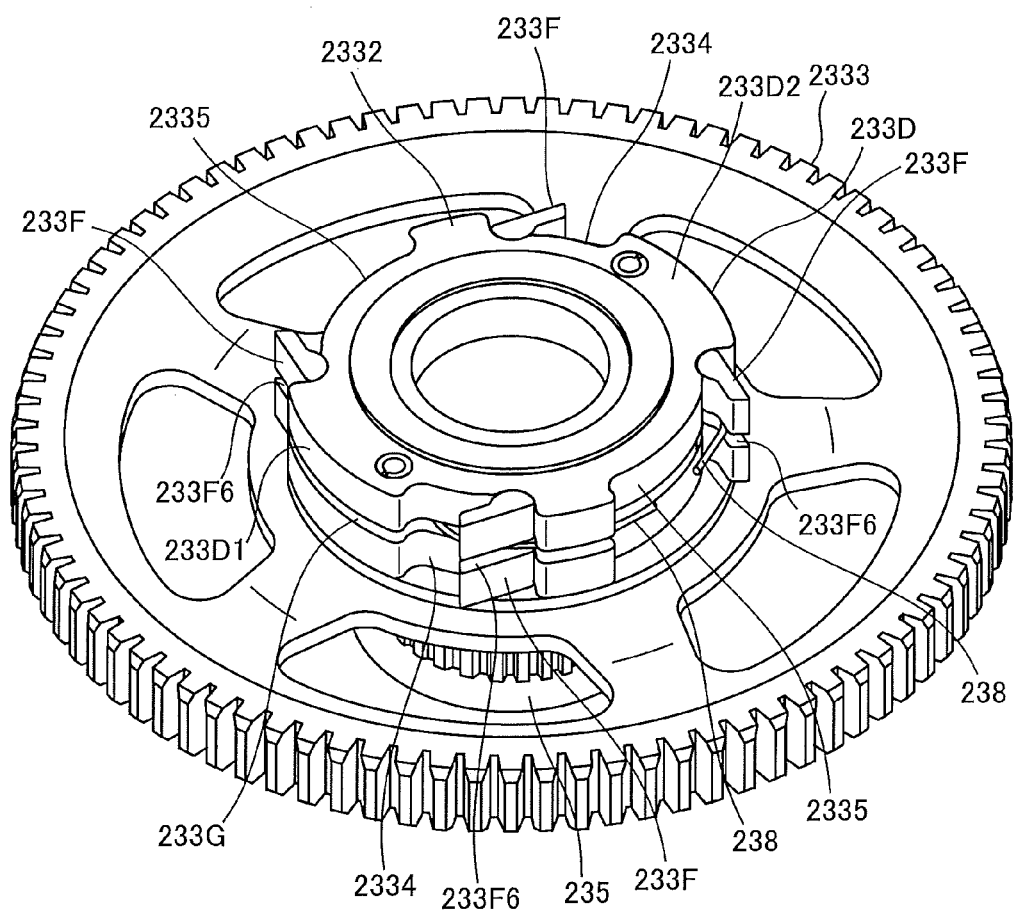
FIG. 7 is a perspective view of the one-way clutch with the driving member removed.

The one-way clutch 233 will be described in detail with reference to FIGS. 5 and 7. FIG. 7 is a perspective view of the one-way clutch 233, with the driving member 2331 removed.

The driven member 2332 includes two receptacles 2334 and two receptacles 2335. The receptacles 2334 and 2335 are located on portions of the driven member 2332 that are located inward of the driving member 2331, for example, the outer peripheral portion 233D of the portion extending into the driving member 2331. The receptacles 2334 and 2335 are open on the outer peripheral surface 233D1 of the outer peripheral portion 233D and the left end surface 233D2 of the outer peripheral portion 233D (for example, furthermost plane thereof in a first axial direction).

One of the two receptacles 2334 is located on the side of the central axis 2332L of the driven member 2332 (for example, central axis CL1 of the crank axle 22) that is opposite to the side including the other receptacle 2334 such that the two receptacles are arranged in a radial direction of the driven member 2332. One of the two receptacles 2335 is located on the side of the central axis 2332L of the driven member 2332 that is opposite to the side including the other receptacle 2335 such that the two receptacles are arranged in a radial direction of the driven member 2332. The receptacles 2334 and 2335 are alternately arranged in the circumferential direction of the driven member 2332. A dimension of each receptacle 2334 in the circumferential direction of the driven member 2332 is smaller than a dimension of each receptacle 2335 in the circumferential direction of the driven member 2332.

Each of the receptacles 2334 and 2335 preferably includes a recess 2336 located at one end in the circumferential direction of the driven member 2332. Each recess 2336 is open on the inner surface of its respective receptacle 2334 or 2335.

The clutch lug 233F is received in each of the receptacles 2334 and 2335. For example, preferably four clutch lugs 233F are located on the outer peripheral portion 233D of the driven member 2332. The one-way clutch 233 preferably includes four clutch lugs 233F, for example.

One of the clutch lugs 233F in the two receptacles 2335 is located on a side of the central axis 2332L of the driven member 2332 that is opposite to a side including the other clutch lug 233F such that they are arranged in a radial direction of the driven member 2332. One of the clutch lugs 233F in the two receptacles 2334 is located on a side of the central axis 2332L of the driven member 2332 (for example, central axis CL1 of the crank axle 22) that is opposite to a side including the other clutch lug 233F such that they are arranged in a radial direction of the driven member 2332. The four clutch lugs 233F are spaced apart from each other by an equal or substantially equal distance in the circumferential direction of the driven member 2332.

Figure 8:
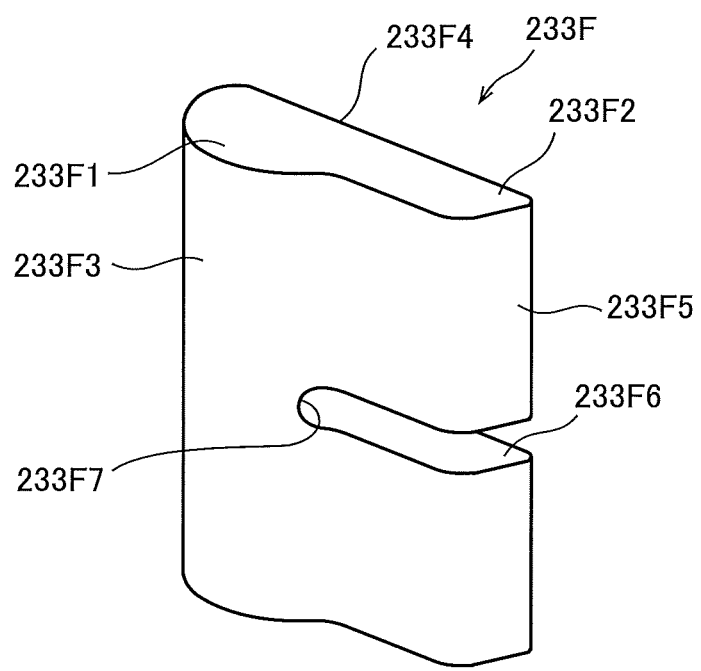
FIG. 8 is a perspective view of a clutch lug.

The clutch lugs 233F will be described in detail with reference to FIGS. 6 and 8. FIG. 8 is a perspective view of a clutch lug 233F. The clutch lug 233F includes a base 233F1 and an extending portion 233F2.

As viewed in an axial direction of the driven member 2332, the base 233F1 includes a slide surface 233F3 that curves in an arc. The slide surface 233F3 of the base 233F1 is in contact with the inner surface of the associated recess 2336. The inner surface of the recess 2336 preferably has a shape that corresponds to that of the slide surface 233F3 (for example, curved in an arc).

The extending portion 233F2 extends straight or substantially straight from the base 233F1. The extending portion 233F2 is preferably shaped as a plate, for example. As viewed in an axial direction of the driven member 2332, the extending portion 233F2 is located toward the second circumferential direction of the driven member 2332 relative to the base 233F1. For example, the extending portion 233F2 is located rearward of the base 233F1 in the direction in which the driving member 2331 rotates forward (for example, right-handed direction in FIG. 5). For example, the extending portion 233F2 extends rearward from the base 233F1 in the direction in which the driving member 2331 rotates forward.

The clutch lug 233F includes a contact surface 233F4 and a contact surface 233F5 which will be described below.

As viewed in an axial direction of the driven member 2332, the contact surface 233F4 extends in the direction in which the extending portion 233F2 extends. As viewed in an axial direction of the driven member 2332, the contact surface 233F5 defines an end of the extending portion 233F2 in the direction in which the extending portion extends. The contact surface 233F5 extends in a direction crossing the contact surface 233F4. As viewed in an axial direction of the driven member 2332, the contact surfaces 233F4 and 233F5 are located outward of the slide surface 233F3 in radial directions of the driven member 2332.

The contact surface 233F5 contacts the contact surface 233C1 of a clutch tooth 233C. A state in which the contact surface 233F5 of a clutch lug 233F is in contact with the contact surface 233C1 of a clutch tooth 233C will be hereinafter referred to as engagement between the clutch lug 233F and clutch tooth 233C.

Figure 9:
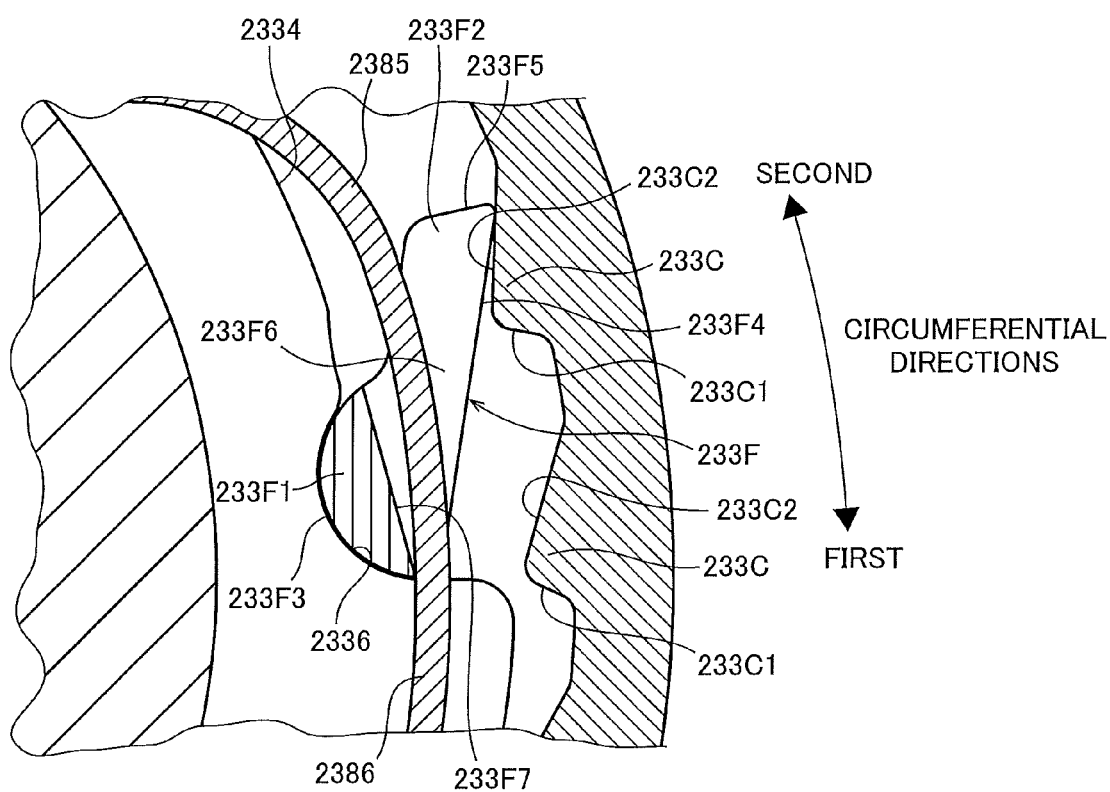
FIG. 9 is an enlarged view of another portion of FIG. 5.

As shown in FIG. 9, the contact surface 233F4 contacts the contact surface 233C2 of a clutch tooth 233C (for example, back of the clutch tooth 233C). In this state, the clutch lug 233F is not in engagement with the clutch tooth 233C. FIG. 9 is an enlarged view of a portion of FIG. 5.

Returning to FIGS. 6 and 8, the clutch lug 233F preferably includes a slit 233F6. The slit 233F6 begins at the end of the extending portion 233F2 and ends in the base 233F1. The inner surfaces of the slit 233F6 includes a contact surface 233F7. The contact surface 233F7 is located in the base 233F1. As viewed in an axial direction of the driven member 2332, the contact surface 233F7 extends in a direction crossing radial directions of the driven member 2332. As viewed in an axial direction of the driven member 2332, the contact surface 233F7 extends in a direction that is different from those of the contact surfaces 233F4 and 233F5. In a preferred embodiment of the present invention, as shown in FIG. 6, as viewed in an axial direction of the driven member 2332, the contact surface 233F7 extends in a direction that is perpendicular or substantially perpendicular to that of the contact surface 233F5.

As shown in FIG. 5, the one-way clutch 233 further includes two pins 237. Two pins 237 will be described with reference to FIG. 5.

Each of the two pins 237 preferably is a rectangular or substantially rectangular metal plate that is bent to form a cylinder and, as a whole, is cylindrical or substantially cylindrical. The two pins 237 are spaced apart from each other by an equal or substantially equal distance in the circumferential direction of the driven member 2332. For example, one pin 237 is located on the side of the central axis 2332L of the driven member 2332 that is opposite to the side including the other pin 237 such that these pins are arranged in a radial direction of the driven member 2332.

Each of the two pins 237 is located between a receptacle 2334 and a receptacle 2335 that are adjacent in the circumferential direction of the driven member 2332. For example, each of the two pins 237 is located between the clutch lug 233F in a receptacle 2334 and the clutch lug 233F in a receptacle 2335 in the circumferential direction of the driven member 2332. In a preferred embodiment of the present invention, as shown in FIG. 5, the clutch lug 233F in a receptacle 2334 is located toward the first circumferential direction of the driven member 2332 relative to the associated pin 237, while the clutch lug 233F in a receptacle 2335 is located toward the second circumferential direction of the driven member 2332 relative to the associated pin 237.

Each of the two pins 237 is press-fitted into a hole 2337 in the outer peripheral portion 233D of the driven member 2332. For example, the two pins 237 are located in the outer peripheral portion 233D. As shown in FIG. 4, each hole 2337 extends in the axial direction of the driven member 2332 and through the driven member 2332. Each of the two pins 237, press-fitted into its respective hole 2337, is pushed against the inner periphery of the hole 2337 by a spring-back of the pin 237.

As shown in FIG. 5, the one-way clutch 233 further includes two springs 238. The two springs 238 will be described with reference to FIG. 5.

The two springs 238 are located within a slit 233G in the outer peripheral portion 233D of the driven member 2332. For example, the two springs 238 are located in the outer peripheral portion 233D. The slit 233G extends over the entire circumference of the driven member 2332. The slit 233G is open on the outer peripheral surface 233D1 of the driven member 2332. A depth (for example, radial dimension) of the slit 233G is generally the same across the entire circumference. The depth (for example, radial dimension) of the slit 233G is larger than a depth (for example, radial dimension) of the receptacles 2334 and 2335. For example, the portions of the slit 233G that correspond to the receptacles 2334 and 2335 are open on the inner surfaces of the receptacles 2334 and 2335. The two springs 238 are located inward of the outer peripheral surface 233D1 of the driven member 2332 in radial directions of the driven member 2332.

One of the two springs 238 is in contact with one of the two pins 237. The other one of the two springs 238 is in contact with the other one of the two pins 237. A middle portion of each of the two springs 238 is in contact with an inner portion of the associated pin 237 in radial directions of the driven member 2332. Each of the two springs 238 is in contact with the clutch lug 233F located toward the first circumferential direction of the driven member 2332 relative to the pin 237 with which the middle portion of the spring 238 is in contact, and with the clutch lug 233F located toward the second circumferential direction of the driven member 2332 relative to the pin 237 with which the middle portion of the spring 238 is in contact. Each spring 238 constantly exerts a biasing force on the associated clutch lugs 233F. The biasing force of the spring 238 acts in a direction to push the base 233F1 of the clutch lugs 233F onto the driven member 2332.

When the two springs 238 are located in the slit 233G, each spring is shaped like a bird spreading its wings, for example, as viewed in an axial direction of the driven member 2332. When the two springs 238 are in a free state, each spring is shaped like a bird closing its wings, for example, compared with the state shown in FIG. 5. In FIG. 5, each of the two springs 238 has its wings spread, as compared with the free state, as the biasing force of the spring 236 is overcome.

The two springs 238 are located on a plane that is perpendicular or substantially perpendicular to the axial direction of the driven member 2332. The two springs 238 extend in directions crossing radial directions of the driven member 2332. Each of the two springs 238 is symmetrical with respect to a straight line L1 as viewed in an axial direction of the driven member 2332. The straight line L1 connects the centers 23371 of the two holes 2337. Each point P1 at which one of the two springs 238 contacts the associated pin 237 is on the straight line L1.

Each of the two springs 238 includes a straight portion 2381, a curved portion 2382, a curved portion 2383, a curved portion 2384, a curved portion 2385, a curved portion 2386, and a straight portion 2387. These portions will be described below with reference to FIG. 5.

The straight portion 2381 extends straight or substantially straight in a direction that is perpendicular or substantially perpendicular to radial directions of the driven member 2332. The curved portion 2382 is connected to a first end of the straight portion 2381. The first end and a second end of the straight portion 2381 are located toward the second circumferential direction of the driven member 2332 relative to the clutch lug 233F in the receptacle 2335.

The curved portion 2382 extends from the first end of the straight portion 2381 in directions crossing radial directions of the driven member 2332. The curved portion 2382 is curved generally along the outer peripheral surface of the driven member 2332. A first end of the curved portion 2382 is located toward the first circumferential direction of the driven member 2332 relative to the clutch lug 233F in the receptacle 2335.

As shown in FIG. 6, the curved portion 2382 passes through the slit 233F6 in the clutch lug 233F in the receptacle 2335. The curved portion 2382 is in contact with an end of the contact surface 233F7 (for example, an end located toward the first circumferential direction of the driven member 2332). As the spring 238 exerts a biasing force on the clutch lug 233F, the slide surface 233F3 of the clutch lug 233F slides along the inner surface of the recess 2336 such that the clutch lug 233F turns upright. The end of the extending portion 233F2 of the clutch lug 233F is located outside the receptacle 2335. For example, the end of the extending portion 233F2 is located outward of the outer peripheral surface 233D1 of the driven member 2332 in radial directions of the driven member 2332.

Returning to FIG. 5, the curved portion 2383 extends from a first end of the curved portion 2382 in directions crossing radial directions of the driven member 2332. The curved portion 2383 is curved with a radius of curvature that is smaller than that of the curved portion 2382. A first end of the curved portion 2383 is located inward of the second end of the curved portion 2383 (for example, first end of the curved portion 2382) in radial directions of the driven member 2332.

The curved portion 2384 extends from the first end of the curved portion 2383 in directions crossing radial directions of the driven member 2332. The curved portion 2384 is curved in the direction opposite to that of the curved portion 2382, with a radius of curvature that is equal or substantially equal to that of the curved portion 2383. A first end of the curved portion 2384 is generally at the same position as the second end of the curved portion 2384 in radial directions of the driven member 2332.

The curved portion 2384 preferably includes the point P1 which is in contact with the pin 237. The point P1 is located in a middle of the curved portion 2384 (for example, a middle in the direction in which the curved portion 2384 generally extends).

The curved portion 2385 extends from the first end of the curved portion 2384 in directions crossing radial directions of the driven member 2332. The curved portion 2385 is curved with a radius of curvature that is equal or substantially equal to that of the curved portion 2383. A first end of the curved portion 2385 is located outward of the second end of the curved portion 2385 (for example, first end of the curved portion 2384) in radial directions of the driven member 2332. The first end of the curved portion 2385 is generally at the same position as the second end of the curved portion 2383 in radial directions of the driven member 2332. The first end of the curved portion 2385 is located in the receptacle 2334. The first end of the curved portion 2385 is located toward the second circumferential direction of the driven member 2332 relative to the clutch lug 237 in the receptacle 2334.

The curved portion 2386 extends from the first end of the curved portion 2385 in the circumferential direction of the driven member 2332. The curved portion 2386 is curved with a radius of curvature that is equal or substantially equal to that of the curved portion 2382. A first end of the curved portion 2386 is located toward the first circumferential direction of the driven member 2332 relative to the clutch lug 233F in the receptacle 2334. The first end of the curved portion 2386 is generally at the same position as the second end of the curved portion 2382 (for example, first end of the straight portion 2381) in radial directions of the driven member 2332.

As shown in FIG. 9, the curved portion 2386 passes through the slit 233F6 in the clutch lug 233F in the receptacle 2334. The curved portion 2386 is in contact with an end of the contact surface 233F7 (for example, end located toward the first circumferential direction of the driven member 2332). As the spring 238 exerts a biasing force on the clutch lug 233F, the slide surface 233F3 of the clutch lug 233F slides along the inner surface of the recess 2336 such that the clutch lug 233F turns upright. The end of the extending portion 233F2 of the clutch lug 233F is located outside the receptacle 2335. For example, the end of the extending portion 233F2 is located outward of the outer peripheral surface 233D1 of the driven member 2332 in radial directions of the driven member 2332.

Returning to FIG. 5, the straight portion 2387 extends straight or substantially straight from the first end of the curved portion 2386 in a direction that is perpendicular or substantially perpendicular to radial directions of the driven member 2332. A first end of the straight portion 2387 is generally at a same position as the second end of the straight portion 2381 in radial directions of the driven member 2332. The first end of the straight portion 2387 of one spring 238 is in the receptacle 2335 in which the second end of the straight portion 2381 of the other spring 238 is located.

The operation of the one-way clutch 233 will be described.

In the one-way clutch 233, as shown in FIG. 5, when the clutch lugs 233F in the two receptacles 2335 arranged in a radial direction are in engagement with clutch teeth 233C, the clutch lugs 233F in the two receptacles 2334 arranged in another radial direction are preferably not in engagement with clutch teeth 233C. When the clutch lugs 233F in the two receptacles 2334 are in engagement with clutch teeth 233C, the clutch lugs 233F in the two receptacles 2335 are preferably not in engagement with clutch teeth 233C. For example, the number of those of the four clutch lugs 233F that are in engagement with clutch teeth 233C is preferably 2, for example. One of these two clutch lugs 233F (for example, clutch lugs 233F engaging clutch teeth 233C) is located on the side of the central axis 2332L of the driven member 2332 that is opposite to the side including the other clutch lug 233F such that the clutch lugs are arranged in a radial direction of the driven member 2332.

The four clutch lugs 233F are constantly urged by the biasing forces of the springs 238 to turn upright. Thus, the clutch lugs 233F engaging clutch teeth 233C are pushed by the biasing forces of the springs 238 against the inner peripheral surface 233B1 of the driving member 2331. The clutch lugs 233F that are not in engagement with clutch teeth 233C are pushed by the biasing forces of the springs 238 against the contact surfaces 233C2 of clutch teeth 233C.

When two clutch lugs 233F are in engagement with clutch teeth 233C, rotation of the driving member 2331 is transmitted to the driven member 2332. Two clutch lugs 233F engage clutch teeth 233C when the driving member 2331 is rotating forward (for example, in the right-handed direction in FIG. 5). For example, when the driving member 2331 is rotating forward, the driven member 2332 also rotates forward. Thus, when the crank axle 22 is rotating forward, the driven member 2332 also rotates forward.

Alternatively, when the driving member 2331 is rotating rearward (for example, in a left-handed direction in FIG. 5), the four clutch lugs 233F are pushed in by the contact surfaces 233C2 of clutch teeth 233C and, when the contact surfaces 233C2 are not in contact any more, the clutch lugs are urged by the biasing forces of the springs 238 to turn upright. Thus, the four clutch lugs 233F do not engage clutch teeth 233C when the driving member 2331 is rotating rearward. For example, rotation of the driving member 2331 is not transmitted to the driven member 2332.

Figure 10:
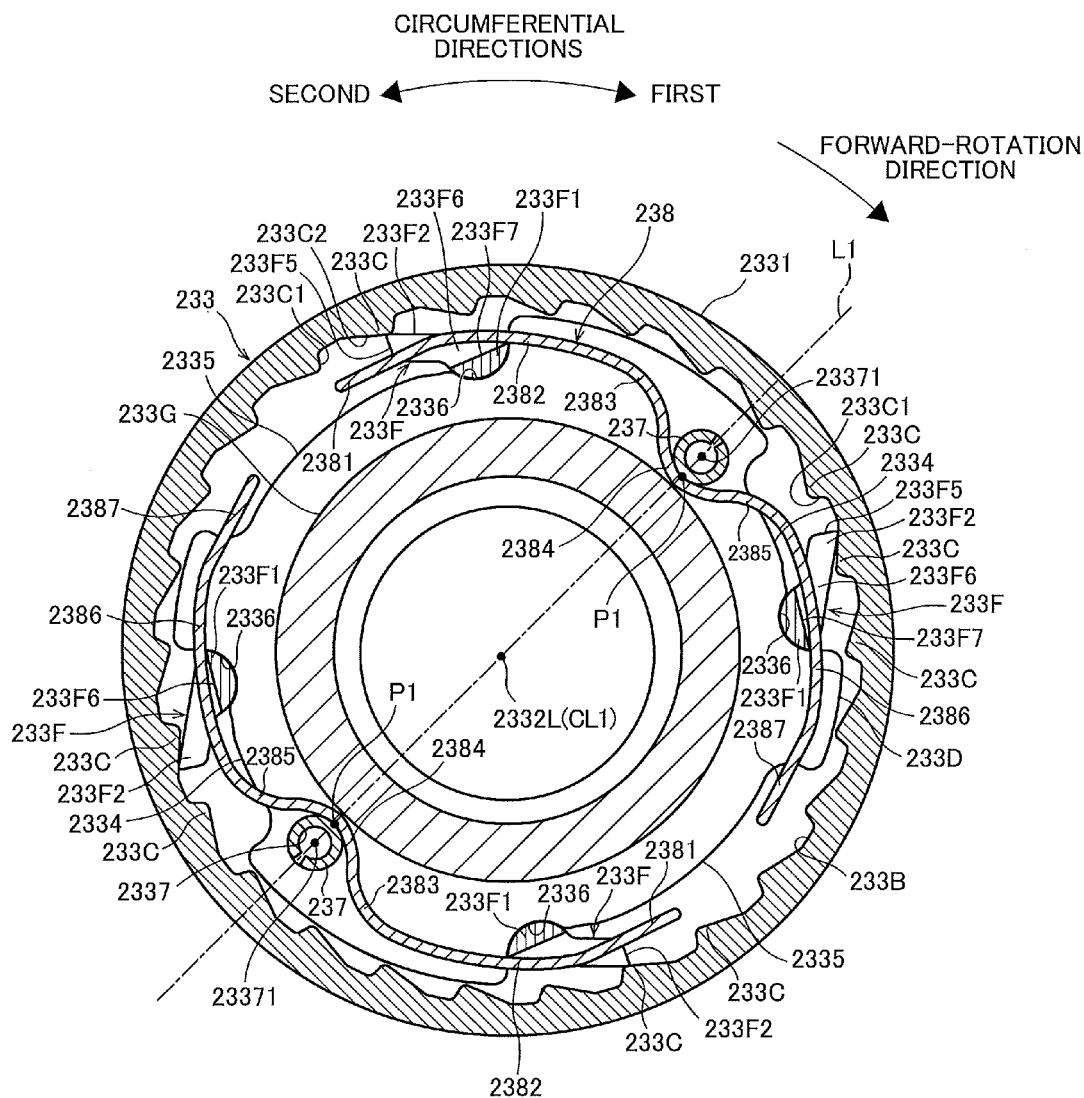
FIG. 10 shows the internal structure of the one-way clutch where each of four clutch lugs is not in engagement with a clutch tooth.

FIG. 10 shows the clutch at a moment when the driving member 2331 is rotated rearward, as discussed above, where the four clutch lugs 233F are not in engagement with clutch teeth 233C. For example, FIG. 10 shows a state in which the four clutch lugs 233F are pushed in by the contact surfaces 233C2 of clutch teeth 233C. Forward rotation of the driving member 2331, starting with the state shown in FIG. 10, will be described below.

The distance between the contact surface 233F5 of the clutch lug 233F located in a receptacle 2335 and the contact surface 233C1 of the clutch tooth 233C located directly forward in the forward-rotation direction of the driving member 2331 is preferably larger than the distance between the contact surface 233F5 of the clutch lug 233F located in a receptacle 2334 and the contact surface 233C1 of the clutch tooth 233C located directly forward in the forward-rotation direction of the driving member 2331. Thus, when the driving member 2331 rotates forward starting with the state shown in FIG. 10, the clutch lug 233F located in a receptacle 2334, rather than the clutch lug 233F located in a receptacle 2335, comes into engagement with a clutch tooth 233C.

The extending portion 233F2 of the clutch lug 233F located in each receptacle 2335 is in contact with the contact surface 233C2 of a clutch tooth 233C. The extending portion 233F2 of the clutch lug 233F located in each receptacle 2334 is similarly in contact with the contact surface 233C2 of a clutch tooth 233C.

When a clutch lug 233F is in contact with the contact surface 233C2 of a clutch tooth 233C, the clutch lug 233F is pushed by the clutch tooth 233C inwardly in radial directions of the driven member 2332. The clutch lug 233F moves against the biasing force of the associated spring 238. For example, the slide surface 233F3 of the clutch lug 233F slides along the inner surface of the associated recess 2336. The end of the contact surface 233F7 in the slit 233F6 of the clutch lug 233F that is in contact with the spring 238 moves outwardly in radial directions of the driven member 2332. Thus, the spring 238 is pushed by the clutch lug 233F outwardly in radial directions of the driven member 2332.

When the curved portion 2386 of the spring 238 is pushed by the clutch lug 233F located in a receptacle 2334 outwardly in radial directions of the driven member 2332, the movement of the spring 238 is restricted by the pin 237 that is in contact with the spring 238. Thus, the spring 238 swings counter-clockwise with respect to the pin 237. At this moment, the curved portion 2382 of the spring 238 pushes the contact surface 233F7 of the clutch lug 233F located in the associated receptacle 2335, inwardly in radial directions of the driven member 2332. For example, the biasing force exerted by the spring 238 on the clutch lug 233F located in the receptacle 2335 increases. As a result, the clutch lug 233F located in the receptacle 2335 is kept upright.

Alternatively, when the clutch lug 233F located in a receptacle 2335 pushes the curved portion 2382 of the spring 238 outwardly in radial directions of the driven member 2332, the movement of the spring 238 is restricted by the pin 237 that is in contact with the spring 238. Thus, the spring 238 swings clockwise with respect to the pin 237. At this moment, the curved portion 2386 of the spring 238 pushes the contact surface 233F7 of the clutch lug 233F located in the associated receptacle 2334, inwardly in radial directions of the driven member 2332. For example, the biasing force exerted by the spring 238 on the clutch lug 233F located in the receptacle 2334 increases. Thus, the clutch lug 233F located in the receptacle 2334 is kept upright.

The clutch lugs 233F located in the receptacles 2334 and the clutch lugs 233F located in the receptacles 2335 are pushed by clutch teeth 233C inwardly in radial directions of the driven member 2332. Accordingly, the movement of each spring 238 is affected by the movement of the one of the associated clutch lugs 233F that is pushed in by a larger amount. In FIG. 10, the clutch lugs 233F located in the receptacles 2335 are pushed in by the clutch teeth 233C by a larger amount than the clutch lugs 233F located in the receptacles 2334. Thus, in FIG. 10, the movement of each spring 238 is affected by the movement of the clutch lug 233F located in the associated one of the receptacles 2335.

For example, in FIG. 10, the curved portion 2382 of each spring 238 is pushed by the clutch lug 233F located in the associated one of the receptacles 2335, outwardly in radial directions of the driven member 2332. The movement of the spring 238 is restricted by the pin 237 that is in contact with the spring 238. The spring 238 swings clockwise with respect to the pin 237. The curved portion 2386 of the spring 238 pushes the contact surface 233F7 of the clutch lug 233F located in the associated one of the receptacles 2334 inwardly in radial directions of the driven member 2332. Thus, the clutch lug 233F located in the receptacle 2334 is kept upright. For example, the clutch lug 233F located in the receptacle 2334 is kept in contact with a clutch tooth 233C by the biasing force of the spring 238. As a result, when the driving member 2331 is rotating forward starting from the state shown in FIG. 10, the clutch lug 233F located in the receptacle 234 comes into stable engagement with a clutch tooth 233C.

At some rotational positions of the driving member 2331 relative to the driven member 2332, the clutch lugs 233F located in the receptacles 2334 are preferably pushed inwardly in radial directions of the driven member 2332 by a larger amount than the clutch lugs 233F located in the receptacles 2335. In these positions, when the driving member 2331 is rotating forward, the clutch lugs 233F located in the receptacles 2335 come into engagement with clutch teeth 233C. The clutch lugs 233F are kept in contact with clutch teeth 233C by the biasing forces of the springs 238. When the driving member 2331 rotates farther forward, the clutch lugs 233F located in the receptacles 2335 come into stable engagement with the clutch teeth 233C.

The electric-motor-assisted bicycle 10 includes the one-way clutch 233. In the one-way clutch 233, the number of clutch lugs 233F is preferably four, for example. The number of clutch lugs 233F is preferably an even number not smaller than four, for example. The number of clutch teeth 233C is preferably 26, for example. The number of clutch teeth 233C is preferably an even number that is not a multiple of the number of clutch lugs 233F, for example. Thus, each of the two of the clutch lugs 233F that face each other in a radial direction, or that radially oppose each other, is in engagement with one of the clutch teeth 233C, while each of the other clutch lugs 233F is not in engagement with any of the clutch teeth 233C. This arrangement stabilizes the operation of the one-way clutch 233 while reducing the load on the clutch lugs 233F.

In the one-way clutch 233, as the driving member 2331 rotates rearward (for example, in the direction opposite to the forward direction), each of the clutch lugs 233F is not in contact with any of the clutch teeth 233C. When the driving member 2331 rotates forward after rearward rotation, the clutch lug 233F that engages a clutch tooth 233C is the one that has to move the smallest distance.

In the one-way clutch 233, a distance required for each of the two clutch lugs 233F facing each other and arranged in a radial direction to come into engagement with a clutch tooth 233C is smaller than a distance required for each of the other clutch lugs 233F to come into engagement with a clutch tooth 233C. For example, two clutch lugs 233F need to move a smaller distance (for example, for a shorter time) to engage a clutch tooth 233C. This arrangement will reduce time lag.

In the one-way clutch 233, the pins 237 which are in contact with the springs 238 are located outward of the springs 238 in radial directions of the driven member 2332. Thus, when some clutch lugs 233F are pushed inwardly in radial directions of the driven member 2332 by a larger amount than the other clutch lugs 233F, each spring 238 swings with respect to the associated pin 237. As a result, the springs 238 push the contact surfaces 233F7 of the other clutch lugs 233F inwardly in radial directions of the driven member 2332 and, thus, keep the other clutch lugs 233F upright. This arrangement stabilizes the operation of the one-way clutch 233.

While preferred embodiments of the present invention have been described, the preferred embodiments are merely examples that allow the present invention to be carried out. Thus, the present invention is not limited to the preferred embodiments, and the preferred embodiments may be modified as appropriate without departing from the spirit of the present invention when carried out.

A preferred embodiment described above includes a drive unit 20 in which the gear 2333 is located on the driven member 2332 of the one-way clutch 233 and a resultant of a human-generated force (for example, pedaling force) and a motor-generated drive force is output. Alternatively, a preferred embodiment of the present invention may include a drive unit in which, instead of the gear 2333 located on the driven member 2332, an auxiliary sprocket located on the rotational shaft of the reduction gear 24 supplies a motor drive force to a midway portion of the chain 36 wound around the driving and driven sprockets 34 and 32.

In a preferred embodiment of the present invention, the middle portion of each spring 238 may be wound around a pin 237. The pin 237 may restrict the movement of the spring 238. Thus, when the springs 238 are pushed by some clutch lugs 233F outwardly in radial directions of the driven member 2332, the springs 238 push the contact surfaces 233F7 of the other clutch lugs 233F inwardly in radial directions of the driven member 2332.

In a preferred embodiment of the present invention, the number of clutch lugs 233F is preferably four, for example. Alternatively, the number of clutch lugs 233F may preferably include, for example, an even number not smaller than four (for example, six).

In a preferred embodiment of the present invention, the outer member (for example, driving member 2331) preferably rotates together with the crank axle 22. Alternatively, the inner member (for example, driven member 2332) may rotate together with the crank axle 22.

In a preferred embodiment of the present invention, a plurality of clutch teeth 233C are preferably located on the inner peripheral surface 233B1 of the inner peripheral portion 233B of the outer member (for example, driving member 2331) while a plurality of clutch lugs 233F are located on the outer peripheral portion 233D of the inner member (for example, driven member 2332). Alternatively, a plurality of clutch lugs may be located on the inner peripheral portion of the outer member while a plurality of clutch teeth may be located on the outer peripheral portion of the inner member.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit attached to a vehicle-body frame of an electric-motor-assisted bicycle, comprising:
   a housing;
   a crank axle extending through the housing; and
   a one-way clutch that is coaxial with the crank axle;
   wherein the one-way clutch includes:
   an outer member including an inner peripheral portion;
   an inner member including an outer peripheral portion; and
   a plurality of pins; wherein
   the inner member extends through the outer member;
   the outer peripheral portion of the inner member faces the inner peripheral portion of the outer member;
   the outer peripheral portion of the inner member and the inner peripheral portion of the outer member are disposed in a radial direction of the crank axle;
   one of the outer member and the inner member rotates together with the crank axle;
   a plurality of clutch teeth are located on one of the inner peripheral portion of the outer member and the outer peripheral portion of the inner member and are spaced apart from each other in a circumferential direction of the crank axle by an equal or substantially equal distance;
   a plurality of clutch lugs are located on the other of the inner peripheral portion of the outer member and the outer peripheral portion of the inner member, and are spaced apart from each other in the circumferential direction by an equal or substantially equal distance; and
   a plurality of springs and the plurality of pins are located on the other of the inner peripheral portion of the outer member and the outer peripheral portion of the inner member;
   the plurality of springs are spaced apart from each other in the circumferential direction by an equal or substantially equal distance;
   a number of the clutch lugs is an even number not smaller than four;
   a number of the clutch teeth is an even number that is not a multiple of the number of the clutch lugs;
   a number of the springs is half the number of the clutch lugs;
   each of the plurality of springs exerts a biasing force on two circumferentially adjacent clutch lugs of the plurality of clutch lugs and position the two adjacent clutch lugs for engagement with two of the plurality of clutch teeth;
   each of the plurality of pins is in contact with a respective one of the plurality of springs and restricts movement of the respective spring; and
   one of the two adjacent clutch lugs is pushed in from the position for engagement with the clutch teeth by a back of one of the plurality of clutch teeth such that the biasing force exerted on the other one of the two adjacent clutch lugs increases.

2. The drive unit according to claim 1, wherein the outer member rotates together with the crank axle.

3. The drive unit according to claim 1, wherein:
the plurality of clutch teeth are located on the inner peripheral portion of the outer member; and
the plurality of clutch lugs are located on the outer peripheral portion of the inner member.

4. The drive unit according to claim 3, wherein the plurality of pins are located on the inner member.

5. The drive unit according to claim 1, wherein each of the plurality of pins is located between two circumferentially adjacent clutch lugs of the plurality of clutch lugs.

6. The drive unit according to claim 1, wherein each of the plurality of springs is swingable with respect to the one of the plurality of pins with which the spring is in contact, is located on a plane which is perpendicular or substantially perpendicular to an axial direction of the crank axle, and is shaped as a wing extending in a direction crossing the radial direction as viewed in the axial direction of the crank axle.

7. The drive unit according to claim 6, wherein a number of the clutch lugs is four.

8. An electric-motor-assisted bicycle comprising the drive unit according to claim 1.

* * * * *